United States Patent Office 3,590,072
Patented June 29, 1971

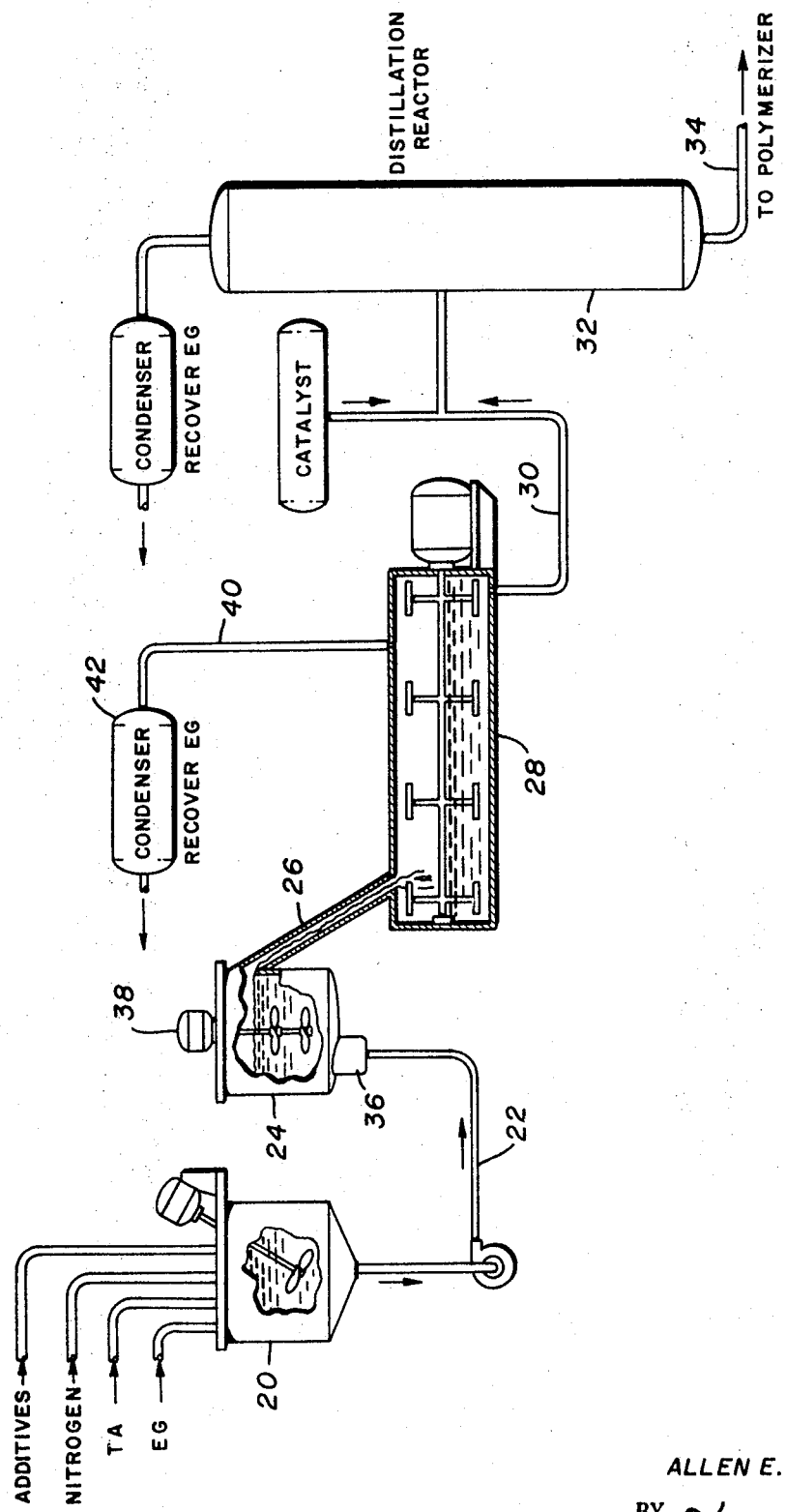

3,590,072
METHOD FOR DIRECT ESTERIFICATION OF TEREPHTHALIC ACID WITH ETHYLENE GLYCOL
Allen E. Leybourne III, Decatur, Ala., assignor to Monsanto Company, St. Louis, Mo.
Filed Nov. 18, 1966, Ser. No. 595,480
Int. Cl. C07c 69/82
U.S. Cl. 260—475                                   10 Claims

ABSTRACT OF THE DISCLOSURE

A slurry of terephthalic acid in ethylene glycol is maintained below 100° C. until being introduced into a reaction zone maintained at a temperature of 200–290° C. The cool slurry prevents agglomeration of the terephthalic acid with consequent plugging of the slurry feed lines.

---

The present invention relates to a process for direct esterification of terephthalic acid with ethylene glycol under specified reaction conditions to obtain efficient esterification.

Polyethylene terephthalate is conventionally made by a process including an ester interchange reaction between, for example, dimethyl terephthalate and ethylene glycol. This conventional process has various disadvantages. For example, dimethyl terephthalate is more expensive than terephthalic acid. The ester interchange reaction is slow, and the methanol evolved in the reaction must be recovered for economic reasons. These and other disadvantages of the conventional process can be avoided by direct esterification of terephthalic acid with ethylene glycol. As one principal problem in the direct esterification reaction, the terephthalic acid in a slurry of terephthalic acid and ethylent glycol tends to agglomerate and plug the feed lines to the reaction zone where esterification begins. According to a major aspect of the present invention, it has been discovered that agglomeration of the terephthalic acid in the slurry feed line can be avoided by maintaining the slurry at a low temperature until the slurry is introduced into the reaction zone.

Accordingly, a primary object of the invention is to provide a method for feeding a terephthalic acid-ethylene glycol slurry to a reaction zone while avoiding plugging of the slurry feed lines.

A further object is to provide a process for efficient direct esterification of terephthalic acid with ethylene glycol.

Other objects of the invention will in part be obvious and will in part appear hereinafter.

For a more complete understanding of the nature and objects of the invention, reference should be had to the following detailed description taken in connection with the accompanying drawing, in which the single figure is a schematic illustration of the preferred process according to the invention.

As is shown schematically in the drawing, terephthalic acid and ethylene glycol are mixed to form a slurry in slurry tank 20. This may be performed at atmospheric pressure and ambient temperature. The resulting slurry is then fed through slurry line 22 to a well-stirred reactor 24, which connects through an overflow line 26 to the inlet of horizontal reactor 28. Glycol and water are condensed from the distillate from reactor 28, and the bottoms from reactor 28 is fed through line 30 to distillation reactor 32. Glycol and water are removed from the distillate of reactor 32, while the essentially completely esterified bottoms in line 34 is fed to polymerization equipment.

Referring now to the drawing in more detail, the slurry is prepared by feeding ethylene glycol and terephthalic acid into well-stirred slurry tank 20. Various additives and pigments can be blended into the slurry if desired, such as heat stabilizing additives, $TiO_2$, etc. Preferably an inert gas such as nitrogen blankets the slurry to exclude oxygen.

As noted above, it has been discovered that the slurry becomes unstable upon heating, with the terephthalic acid tending to agglomerate and coating out on hot surfaces. This can readily result in plugging of the slurry line 22. According to an important aspect of the present invention, the slurry in line 22 is maintained at a temperature less than 100° C., and preferably below 50° C. until it is introduced into reactor 24. If necessary, a cooling coil or jacket 36 may surround line 22 near reactor 24 in order to maintain the slurry at a sufficiently low temperature. As the cool slurry enters reactor 24, it should be quickly blended into and back-mixed with the partially reacted contents of reactor 24, since this will prevent harmful agglomeration of the terephthalic acid on the hot walls of reactor 24. The dilution effect of the partially reacted contents back-mixed in reactor 24 reduces the viscosity and promotes efficient heat transfer.

Reactor 24, where significant esterification begins, is well-stirred as by a plurality of impellers driven by motor 38. The slurry is preferably introduced to reactor 24 beneath the liquid level, to insure that slurry line 22 is filled with cool slurry. A high-shear impeller, e.g., turbine-type, is preferably positioned immediately adjacent the point of entry of the slurry. The other impellers are to generate good recirculation in the tank (high shear not necessary) and may be of the marine type, to quickly blend and back-mix the freshly introduced slurry with the contents of reactor 24.

Liquid level control in vessel 24 may be simply accomplished as illustrated by overflow of line 26 connecting reactor 24 with horizontal reactor 28. Reactor 28 should provide substantial stirring with a minimum of back-mixing. In the preferred embodiment illustrated in the drawing, distillate from reactor 28 is removed through overhead line 40 and condensed by condensor 42 to recover ethylene glycol. Since reactor 24 and reactor 28 are connected by overflow line 26, the vapors produced in reactor 24 may also be removed through line 40. Vessels 24 and 28 are maintained by suitable heating means at a temperature between 200° C. and 290° C. while the pressure is maintained between about −10 and +50 p.s.i.g. The flow rate of slurry in line 22 is selected, together with the liquid volume in reactor 24 and reactor 28, to provide a product holdup or residence time in vessels 24 and 28 of between 5 and 200 minutes.

Reactors 24 and 28 can readily produce a bottoms leaving through line 30 which is at least 80% to 95% esterified (that is, in which at least 80% to 95% of the carboxyl groups have been esterified). However, to obtain substantially complete esterification in vessel 28 frequently requires greatly extended reaction times and degradation of the product. According to a further major aspect of the invention, substantially complete esterification is accomplished by feeding the bottoms in line 30 to a distillation reactor 32. In its simplest form, reactor 32 may be a conventional stripping column, having either packing or plates below the point of feed, and a reboiler at the bottom of the column. The recovered overhead distillate will include water and ethylene glycol, while the bottoms leaving in line 34 will be almost 100% esterified.

Reactor 32 should have a product holdup between the feed point and line 34 of between 1 and 200 minutes, and the column below the feed point should be maintained at a temperature between 200° and 290° C. and at a pressure between −10 and +50 p.s.i.g. A small amount of refluxing above the feed point is advantageous, although not essential.

EXAMPLE

Terephthalic acid and ethylene glycol were blended in tank 20, at a ratio of 26.5 pounds glycol to 17.5 pounds terephthalic acid. The resulting slurry was fed at 44 pounds per hour and at a pressure of 35 p.s.i.g. to the bottom of reactor 24. The slurry was maintained at ambient temperature until it actually entered reactor 24. A high-shear impeller (4" in diameter, turbine-type, rotating at 400 r.p.m.) was so mounted that the slurry entered immediately adjacent the periphery of the impeller. A marine-type impeller was mounted above the high-shear impeller on the same shaft, pumping downwardly. The liquid in reactor 24 was thus well-stirred and thoroughly back-mixed with the slurry. The temperature in reactors 24 and 28 was 248° C., and the pressure was 32 p.s.i.g. At the above slurry feed rate, the volumes of reactors 24 and 28 were such that the holdup time was approximately one hour, 48 minutes of which was in reactor 24.

The bottoms leaving in line 30 was 95% esterified based on the terephthalic acid feed stock, and the molar ratio (based on molecular residues) was about 2 mols glycol per mol acid, since about half the glycol distilled off overhead.

Column 32 had a reboiler temperature of 240° C., while the vapor leaving the top of column 32 had a temperature of 196° C. Column 32 was packed with quarter-inch ceramic saddles, to provide a packing holdup below the feed of 30 minutes, with a reboiler holdup of 30 minutes. The bottom leaving line 34 at 21.7 pounds per hour was 99.8% esterified. The glycol recovered overhead from reactor 28 and column 32 was recovered and recycled to slurry tank 20.

It will thus be seen that the objects set forth above, among those made apparent from the preceding description, are efficiently attained, and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for direct esterification of terephthalic acid with ethylene glycol wherein a cool slurry of terephthalic acid and ethylene glycol is fed to a well-stirred reaction zone containing a heated mixture of terephthalic acid, ethylene glycol and reaction products thereof, said process comprising the steps of:
   (a) maintaining said zone at a temperature between 200°–290° C. and at a pressure between —10 and +50 p.s.i.g.,
   (b) maintaining said cool slurry at a temperature less than 100° C. until said slurry enters said zone, and
   (c) introducing said cool slurry into a turbulent region of said zone, whereby said slurry is rapidly sheared and blended into said heated mixture.

2. The process defined in claim 1, wherein a portion of said mixture is removed from said reaction zone at a rate so as to maintain a substantially constant liquid level in said reaction zone.

3. The process defined in claim 2, wherein the rate of feed of said slurry and the volume of fluid in said zone is selected to provide a product holdup in said zone of between 5 and 200 minutes.

4. The process defined in claim 2, further comprising:
   (a) feeding said portion through a second reaction zone maintained at a temperature between 200° and 290° C. and at a pressure between —10 and +50 p.s.i.g.,
   (b) recovering ethylene glycol from the distillate from said second reaction zone,
   (c) and removing partially esterified terephthalic acid from the bottoms of said second reaction zone.

5. The process defined in claim 4, wherein the process holdup in said first and said second reaction zones is a total of between 10 and 200 minutes.

6. The process defined in claim 4, wherein the process holdup in said first and said second reaction zones is sufficient to esterify between 50% and 95% of the carboxyl groups of said terephthalic acid.

7. The process defined in claim 1, wherein said slurry comprises between 1 and 6 mols of ethylene glycol per mol of terephthalic acid.

8. A process defined in claim 1, wherein said slurry is introduced to said stirred reaction zone at a point below the liquid level of said heated mixture.

9. The process defined in claim 1, wherein said slurry is maintained at a temperature less than 50° C.

10. The process defined in claim 6, further comprising:
   (a) feeding the bottoms from said second reaction zone to a stripping column having a total product holdup between 1 and 200 minutes,
   (b) maintaining said stripping column at a temperature between 200° and 290° C. and at a pressure between —10 and +50 p.s.i.g.,
   (c) recovering ethylene glycol from the distillate of said stripping column,
   (d) and recovering substantially completely esterified terephthalic acid from the bottoms of said stripping column.

References Cited

UNITED STATES PATENTS

| 3,185,668 | 5/1965 | Meyer et al. | 260—475 |

FOREIGN PATENTS

| 990,642 | 4/1965 | Great Britain | 260—475 |
| 1,001,787 | 8/1965 | Great Britain | 260—475 |

CHARLES B. PARKER, Primary Examiner

E. J. SKELLY, Assistant Examiner

U.S. Cl. X.R.

260—75